Sept. 17, 1957   P. G. H. OHLSTRÖM   2,806,719
SEALING MEANS FOR ROTARY CONSTRUCTIONS
Filed Jan. 12, 1953

INVENTOR.
PAUL GUSTAV HENRIK OHLSTROM
BY
*Albert M. Parker*
ATTORNEY.

2,806,719
Patented Sept. 17, 1957

2,806,719

SEALING MEANS FOR ROTARY CONSTRUCTIONS

Paul Gustav Henrik Ohlström, Karhula, Finland, assignor to A. Ahlstrom Osakeyhtio, Karhula, Finland, a company of Finland Application January 12, 1953, Serial No. 330,610

5 Claims. (Cl. 285—272)

The object of my invention is to produce a device for sealing the joint between rotary structures provided with co-axially cooperating cylindrical sealing surfaces with equal or substantially equal diameters. The purpose of the sealing device is to prevent the passage of air through said joint between the abutting ends of said sealing surfaces. The sealing device according to the invention is designed especially for sealing the rotary drum of a per se known suction drum filter, provided with a stationary suction chamber connected to a source of suction such as an exhauster, the frame of said chamber having bearings for the drum axis. However, the sealing device according to the invention, is also applicable to any construction or machine where there are joints of the aforesaid character, even when both said sealing surfaces rotate in the same or opposite directions. Thus, said sealing device allows the rotation of either one or both sealing surfaces, thereby securing an airtight sealing of the joint therebetween.

The sealing device according to the invention comprises, in combination, two co-axial cylindrical sealing surfaces in relative rotation, with abutting ends of equal or at least substantially equal diameter; a sealing belt of wear resistant material with low friction coefficient, such as plasto rubbers, balata or leather, of length corresponding to the periphery of said sealing surfaces and adapted to encircle and overlap the joint therebetween; another belt of soft airtight material, preferably foam rubber, on the upper surface of said first named belt; the adjoining ends of said two belts being displaced in relation to each other and preferably bevelled; a metal strap of substantialy the breadth of said belts and adapted to encircle the belt of said soft material; at the ends of said metal strap means for pressing both belts around said sealing surfaces and means for securing said metal strap to a point on the frame of the construction.

Figure 1:
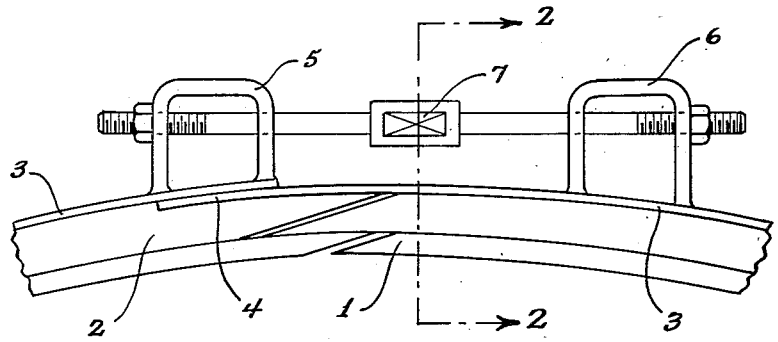
Figure 2:
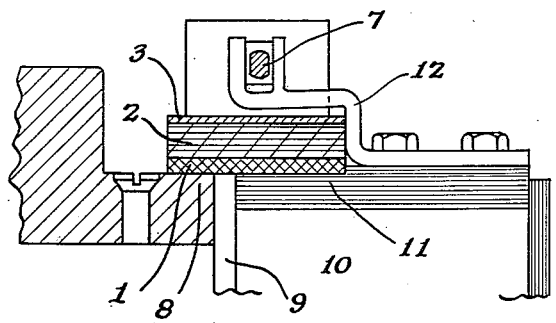

Referring to the accompanying drawings, which are made a part hereof, and on which similar reference characters indicate similar parts, Fig. 1 examplifies a side view of a sealing device according to the invention. Fig. 2 shows a cross-section thereof principally on the line 2—2 of Fig. 1. Because the rotary constructions are known per se, only parts thereof are shown in Fig. 2, which parts respectively correspond with the sealing surfaces of a rotatable strainer drum and its suction chambers, such a drum being described for instance in the pending patent application Ser. No. 208,552 of January 1, 1951 now Patent No. 2,689,653 dated September 21, 1954. In the drawings the belt, made of resistant material such as plasto rubber, balata or leather, is marked 1 and represents the sealing belt proper serving as a glide tightener and permitting the rotary movement of the construction or constructions, such as a rotary strainer drum. The bevelled ends of said belt overlap each other. A foam rubber, belt 2 has bevelled ends overlapping each other. The end joint of the first named belt 1 is displaced relative the joint of the second belt 2 (Fig. 1). Preferably the foam rubber belt 2 is for instance, vulcanized or cemented or in some other suitable manner fixed on to the outer surface of the belt 1. A metal strap 3 encircles the two said belts for pressing the said belt against the sealing surfaces. Also the ends of the strap 3 overlap each other as shown at 4. The overlapping end of the metal strap 3 has a fixing means 5 and at a suitable distance from the underlapping end of said strap 3 is a similar fixing means 6. The fixing means 5 and 6 are designed to be held together by a clamping screw 7, which makes it possible to press the sealing belts against the sealing surfaces. The one side part of the belt 1 lies tightly against the sealing surface 8 (representing in the drawings the tightening or sealing surface at one end of a suction strainer drum). The other side part of the belt lies against the other sealing surface 11 (representing in the drawings the corresponding stationary sealing surface of the suction chamber). Consequently, said belts 1 and 2 seal the joint 9 between said surfaces 8, 11 airtightly, the sealing belts remaining immovable in relation to the stationary surface 11, while the soft foam rubber belt 2 permits the rotation of the drum. Furthermore, the metal strap 3 is secured to a point on the frame or body of the suction chamber by means of an arm 12, the one end of which is fixed to said frame while the other end cooperates with the clamping screw 7 in order to hold the belts in place, as shown in Fig. 2 wherein said arm 12 with its fastening nuts is shown in whole.

According to a modification of the invention, as applied to sealing a rotary construction and a stationary one, it is not absolutely necessary that the glide tightening belt 1 extends to the stationary sealing surface provided the soft belt in itself is airtight. In this case it is possible to use a glide tightening belt 1 of smaller breadth adapted to overlie only the rotary sealing surface. If, conversely, both sealing surfaces are rotatable, the aforementioned glide tightening belt must rest upon both sealing surfaces and be of sufficient breadth to overlap the joint. In this case a number of holding arms, corresponding to the aforesaid arm 12, are provided and fixed to the metal strap, the one ends of said arms being fixed to points on the frame of the construction, the other ends being rigidly secured to suitable fixing means of the stretching metal strap thus preventing movement of sealing belts.

The sealing belt proper 1 and the belt of soft material are preferably attached to each other in such manner as to be easily replaced by new ones. Accordingly, my invention comprises both sealing belts per se employed for the purpose described above.

Having thus fully described my invention, what I claim as new and desire to secure by Letters Patent, is:

1. Sealing construction for sealing the joint between the suction chamber and a suction drum strainer for the straining of pulp, said chamber and strainer having substantially coaxial cylindrical axially abutting sealing surfaces of large diameter in relative rotation, said surfaces being of substantially equal diameter, comprising in combination a first sealing belt formed of hard wear-resistant non-metallic material with a low co-efficient of friction and of a length corresponding to the peripheral length of said cylindrical surfaces, said belt being discontinuous and mounted in contact with and in encircling relation with respect to the periphery of both of said sealing surfaces and in overlapping relation with respect to the abutment thereof, a second discontinuous belt of soft, compressible, resilient material mounted on the outer surface of said first belt and extending substantially throughout the length and width of the same, said second belt being separated from said cylindrical surfaces by said sealing belt, the ends of said first belt terminating at a position circumferentially spaced with respect to the position of termination of the ends of said second belt, a sheet metal belt encircling said second belt engaging the outer surface thereof and extending throughout the length and width of said outer surface, said metal belt being discontinuous, and means adjacent the ends of said metal belt for drawing the ends of said metal belt past one another to place and maintain said metal belt in tight engagement with the exterior surface of said second belt throughout the area of said cylindrical surfaces and through said second belt for pressing said first belt tightly against said sealing surfaces, and means positioning said metal belt in overlying concentric relation with respect to the joint between said sealing surfaces.

2. Sealing construction as in claim 1 and including, the ends of each of said first and said second belts overlapping in beveled portions.

3. Sealing construction as in claim 1 and including, said first belt being formed of relatively hard plastic material.

4. Sealing construction as in claim 1 and including, said first belt being formed of leather.

5. Sealing construction as in claim 1 and including, said second belt being formed of foam rubber.

References Cited in the file of this patent

UNITED STATES PATENTS

| | | |
|---|---|---|
| 1,119,803 | Brown | Dec. 8, 1914 |
| 1,278,598 | Cooper | Sept. 10, 1918 |
| 1,383,466 | Jett | July 5, 1921 |
| 1,504,342 | Hauber | Aug. 12, 1924 |
| 2,205,910 | Raybould | June 25, 1940 |
| 2,417,741 | Dillon | Mar. 18, 1947 |
| 2,469,078 | Robison | May 3, 1949 |
| 2,567,527 | Parks | Sept. 11, 1951 |